United States Patent
Chatterjee et al.

(10) Patent No.: US 10,803,252 B2
(45) Date of Patent: *Oct. 13, 2020

(54) METHOD AND DEVICE FOR EXTRACTING ATTRIBUTES ASSOCIATED WITH CENTRE OF INTEREST FROM NATURAL LANGUAGE SENTENCES

(71) Applicant: WIPRO LIMITED, Bangalore (IN)

(72) Inventors: Arindam Chatterjee, Gondalpara (IN); Kartik Subodh Ballal, Pune (IN)

(73) Assignee: Wipro Limited, Bangalore (IN)

( * ) Notice: Subject to any disclaimer, the term of this patent is extended or adjusted under 35 U.S.C. 154(b) by 147 days.

This patent is subject to a terminal disclaimer.

(21) Appl. No.: 16/111,266

(22) Filed: Aug. 24, 2018

(65) Prior Publication Data
US 2020/0004822 A1     Jan. 2, 2020

(30) Foreign Application Priority Data
Jun. 30, 2018  (IN) .............................. 201841024441

(51) Int. Cl.
*G10L 15/22*  (2006.01)
*G06F 16/00*  (2019.01)
(Continued)

(52) U.S. Cl.
CPC ............ *G06F 40/30* (2020.01); *G06F 40/205* (2020.01); *G06F 40/253* (2020.01); *G06N 3/08* (2013.01)

(58) Field of Classification Search
CPC .................................. G06F 14/00; G06F 40/00
See application file for complete search history.

(56) References Cited

U.S. PATENT DOCUMENTS 7,716,056 B2 *  5/2010  Weng .................... G06F 40/295
                                                                    704/275
2008/0221878 A1  9/2008  Collobert et al.
(Continued)

FOREIGN PATENT DOCUMENTS

CN    101814067 A    8/2010
CN    107168945 A    9/2017

OTHER PUBLICATIONS

Goldberg, Y., "A Primer of Neural Network Models for Natural Language Processing", Cornell University Library, https://arxiv.org/abs/1510.00726, 2015, pp. 1-75.
(Continued)

*Primary Examiner* — Shreyans A Patel
(74) *Attorney, Agent, or Firm* — Finnegan, Henderson, Farabow, Garrett & Dunner, LLP (57) ABSTRACT

A method and device for extracting attributes associated with Center of Interest (COI) from natural language sentences is disclosed. The method includes creating an input vector comprising a plurality of parameters for each target word in a sentence inputted by a user. The method further includes processing for each target word, the input vector through a trained bidirectional GRU neural network, which is trained to identify attributes associated with COI from a plurality of sentences. The method includes associating COI attribute tags to each target word in the sentence based on processing of associated input vector through the trained bidirectional GRU neural network. The method further includes extracting attributes from the sentence based on the COI attribute tags associated with each target word in the sentence. The method further includes providing a response to the sentence inputted by the user based on the attributes extracted from the sentence.

17 Claims, 6 Drawing Sheets

(51) Int. Cl.
*G06F 40/00* (2020.01)
*G06F 40/30* (2020.01)
*G06N 3/08* (2006.01)
*G06F 40/205* (2020.01)
*G06F 40/253* (2020.01)

(56) References Cited

U.S. PATENT DOCUMENTS

| | | | |
|---|---|---|---|
| 2014/0040312 A1* | 2/2014 | Gorman | G06F 16/245 707/771 |
| 2014/0180728 A1 | 6/2014 | Biddle et al. | |
| 2017/0116250 A1 | 4/2017 | Allen et al. | |
| 2018/0231391 A1* | 8/2018 | Yang | G01C 21/3617 |
| 2019/0228073 A1* | 7/2019 | Chatterjee | G06F 16/3334 |

OTHER PUBLICATIONS

Liu, P., et al., "Recurrent Neutral Network for Text Classification with Muiti-Task Learning", Proceedings of the Twenty-Fifth International Joint Conference on Artificial Intelligence (IJCAI-16), 2016, pp. 2873-2879.

* cited by examiner

METHOD AND DEVICE FOR EXTRACTING ATTRIBUTES ASSOCIATED WITH CENTRE OF INTEREST FROM NATURAL LANGUAGE SENTENCES

TECHNICAL FIELD

This disclosure relates generally to processing natural language sentences and more particularly to method and device for extracting attributes associated with centre of interest from natural language sentences.

BACKGROUND

Systems based on artificial intelligence, using Natural Language Processing (NLP) and Natural Language Understanding (NLU) to interact with users/customers are highly coveted requirement nowadays. Conventional systems, which use Artificial Intelligence (AI) to decipher a user query content, are obsessed with user intent and its identification. User intent is the information pertaining to 'what' the user wants. As intelligent systems are evolving, resolving only the user intent may not suffice.

Intelligent systems using NLU, rely heavily on identifying key information in incoming user queries. The most vital information being the user intent. However, just finding the user intent is not enough to understand a user query in its entirety, especially in systems that require specific information. An integral part of the user intent is the center of interest, which is the central idea that the user tries to communicate in an utterance. The central idea further has several attributes, which need to be captured in order to grasp a wholesome understanding of the context and content in the user utterance. The attributes provide the additional crucial details from the user utterance that may be required by the Intelligent systems to provide an accurate response or perform a relevant action. However, these attributes may not be consequent in their occurrence in a user utterance and may be spread across different parts of the user utterance. Thus, conventional systems, fail to identify and extract such attributes from a user utterance.

SUMMARY

In one embodiment, a method for extracting attributes associated with Center of Interest (COI) from natural language sentences is disclosed. The method includes creating, by a COI attribute processing device, an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word. The method further includes processing for each target word, by the COI attribute processing device, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI. The method includes associating, by the COI attribute processing device, COI attribute tags to each target word in the sentence based on processing of associated input vector through the trained bidirectional GRU neural network. The method further includes extracting, by the COI attribute processing device, attributes from the sentence based on the COI attribute tags associated with each target word in the sentence. The method further includes providing, by the COI attribute processing device, a response to the sentence inputted by the user based on the attributes extracted from the sentence.

In another embodiment, a Center of Interest (COI) attribute processing device for extracting attributes associated with COI from natural language sentences is disclosed. The COI attribute processing device includes a processor and a memory communicatively coupled to the processor, wherein the memory stores processor instructions, which, on execution, causes the processor to create an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word. The processor instructions further cause the processor to process for each target word, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI. The processor instructions cause the processor to associate COI attribute tags to each target word in the sentence based on processing of associated input vector through the trained bidirectional GRU neural network. The processor instructions further cause the processor to extract attributes from the sentence based on the COI attribute tags associated with each target word in the sentence. The processor instructions cause the processor to provide a response to the sentence inputted by the user based on the attributes extracted from the sentence.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word; processing for each target word, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI; associating COI attribute tags to each target word in the sentence based on processing of associated input vector through the trained bidirectional GRU neural network; extracting attributes from the sentence based on the COI attribute tags associated with each target word in the sentence; and providing a response to the sentence inputted by the user based on the attributes extracted from the sentence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
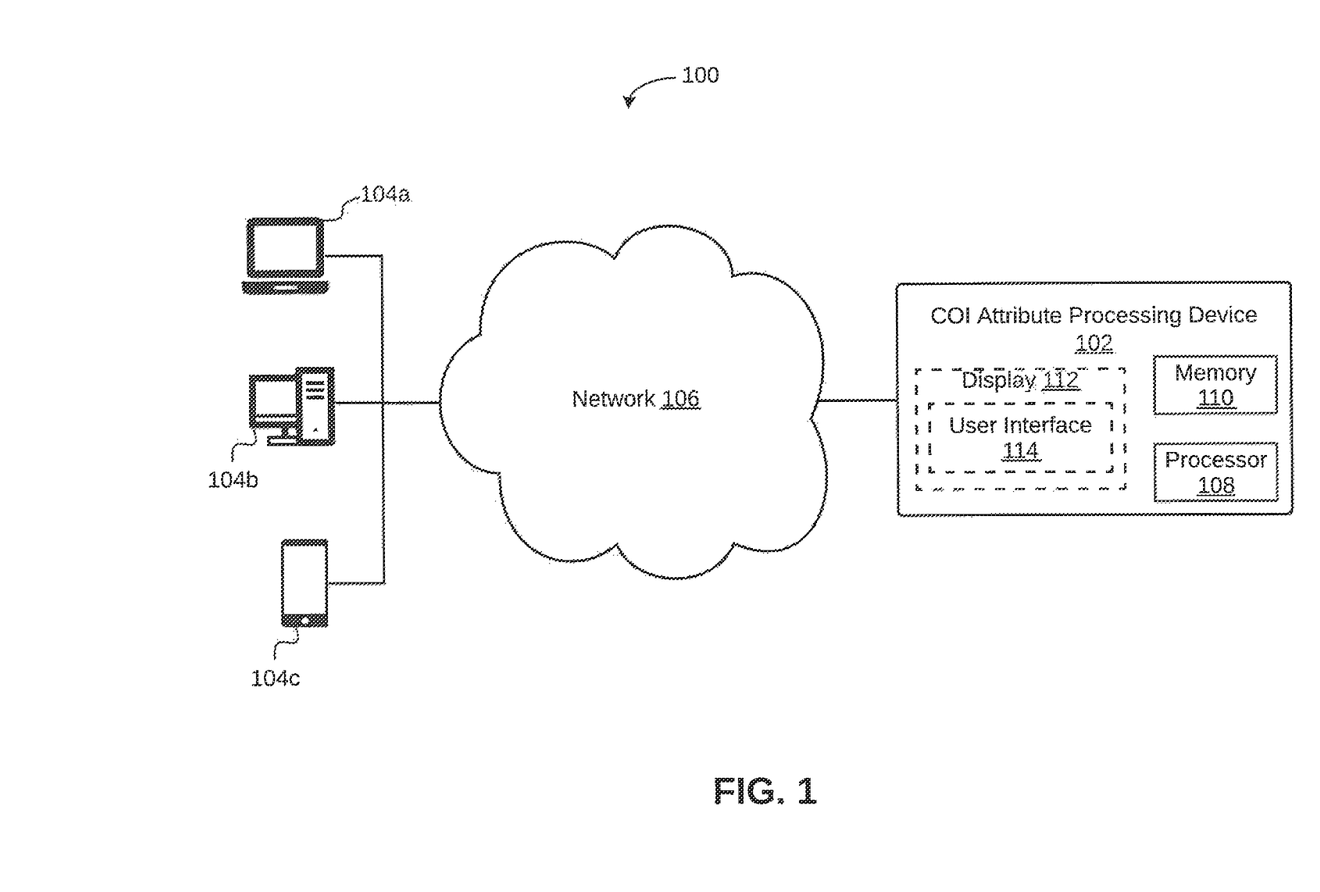
FIG. 1 is a block diagram illustrating a system for extracting attributes associated with Center of Interest (COI) from natural language sentences, in accordance with an embodiment.

Additional illustrative embodiments are listed below. In one embodiment, a system 100 for extracting attributes associated with Center of Interest (COI) from natural language sentences is illustrated in FIG. 1. The natural language sentences may occur within documents. Examples of these documents may include, but are not limited to PDF documents, images, or web-pages. Alternatively, the natural language sentences may be inputted by a user either vocally (for example, on an Interactive Voice Response (IVR) menu) or by way of text (for example, on a chat window).

A natural language sentence uttered by a user may include a user intent. The user intent may be a combination of an action or a verb and a component on which the action needs to be performed. The component is an integral part of the intent and is the COI within the natural language sentence. The COI is the central idea or central notion that a user tries to communicate in an utterance through the natural language sentence. The utterance may either be vocal or by way of text. Within the user intent, the COI may further have several attributes associated with it, based on which the action needs to be performed on the COI. These attributes enable determining and establishing a complete understanding of the context and content in the user utterance. As a result, capturing and extracting these attributes is important. These attributes may be a phrase in the natural language sentence. Alternatively, the attribute may be a single word. In an embodiment, for a single intent, the natural language sentence may include a plurality of attributes. In other words, there can be multiple such attributes in a single user utterance. In an embodiment, these attributes may be termed as COI Qualifiers (CoIQs).

By way of an example, the user may provide the following query: "How can I travel to from Electronic City to Bangalore Airport by bus, in the evening?" to a COI attribute processing device 102 in the system 100. The COI attribute processing device 102 may include a man machine interface system (for example, conversation engines, search engines, data mining systems, information retrieval systems, question answering systems, or chatbots). The user intent in this query is: "travel: from Electronic City to Bangalore Airport; by bus; evening." The action is: "travel." The center of interest is: "from Electronic City to Bangalore Airport." The attributes associated with the center of interest are: "by bus; in the evening." For such a query, the COI attribute processing device 102 may be able to provide an appropriate response or action to the query based on the attributes, i.e., "by bus; in the evening."

Thus, the COI attribute processing device 102 extracts attributes associated with the COI in natural language sentences, in order to provide accurate and appropriate response to a user query. Examples of the COI attribute processing device 102 may include, but are not limited to an application server, a laptop, a desktop, an application server, a smart phone, or a tablet. The natural language sentences may be provided by one or more users through a plurality of computing devices 104 (for example, a laptop 104a, a desktop 104b, and a smart phone 104c). The plurality of computing device 104 may be communicatively coupled to the COI attribute processing device 102 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

When a user of the laptop 104a, for example, may want to interact, via voice inputs, with an intelligent system (for example, an intelligent personal assistant, search engine, chat bots, question answering systems, conversation engines, or data mining tools) installed on the COI attribute processing device 102 to resolve a query, the laptop 104a may communicate with the COI attribute processing device 102, via the network 106. The COI attribute processing device 102 may then process the voice inputs (which would be one or more natural language sentences) to extract the attributes associated with the COI in the voice inputs and accordingly respond to the query. To this end, the COI attribute processing device 102 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The memory 110 may further include various modules that enable the COI attribute processing device 102 to extract COI attributes from natural language sentences. These modules are explained in detail in conjunction with FIG. 2. The COI attribute processing device 102 may further include a display 112 having a User Interface (UI) 114 that may be used by a user or an administrator to provide queries (either verbal or textual) and various other inputs to the COI attribute processing device 102. The display 112 may further be used to display a response or resolution to the query provided by the user. The functionality of the COI attribute processing device 102 may alternatively be configured within each of the plurality of computing devices 104.

Figure 2:
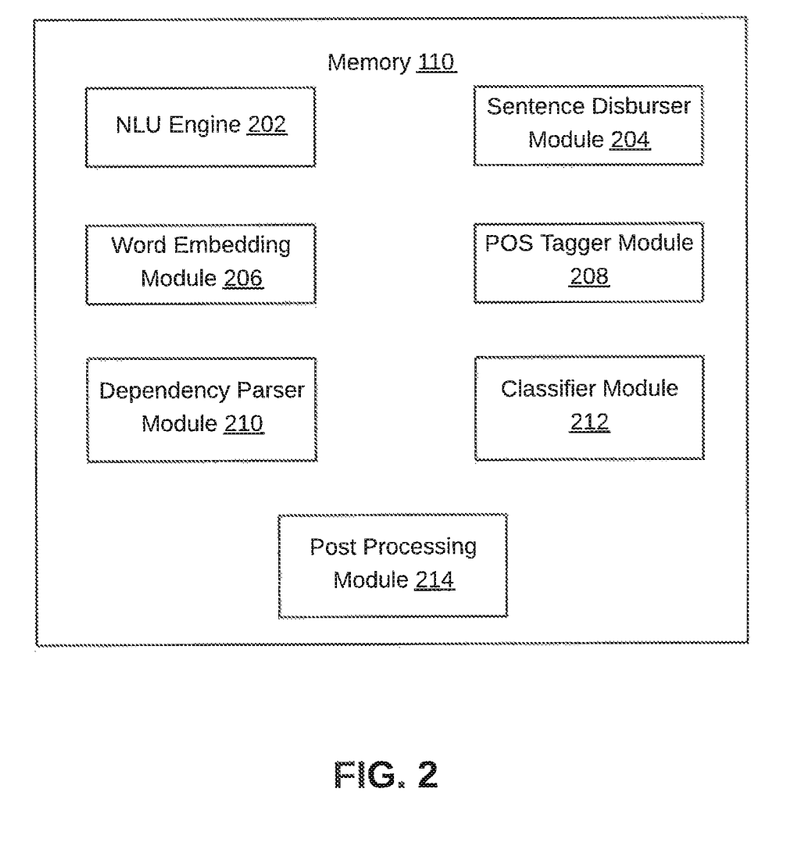
FIG. 2 is a block diagram illustrating various modules within a memory of a COI attribute processing device configured to extract attributes associated with COI from natural language sentences, in accordance with an embodiment.

Referring now to FIG. 2, a block diagram of various modules within memory 110 of the COI attribute processing device 102 configured to extract attributes associated with COI from natural language sentences is illustrated, in accordance with an embodiment. Memory 110 includes a Natural Language Understanding (NLU) engine 202, a sentence disburser module 204, a word embedding module 206, a Part Of Speech (POS) tagger module 208, a dependency parser module 210, a classifier module 212, and a post processing module 214.

The NLU engine 202 receive text in natural language and deciphers the content, intent, and several other granular details from the text. Examples of NLU Engine 202 may include, but are not limited to search engines, chat bots, question answering systems, conversation engines, intelligent personal assistants, or data mining tools. Thereafter, the sentence disburser module 204 obtains raw text from the NLU Engine 202 as input. The sentence disburser module 204 then breaks down the raw text into sentences from which attributes associated with COI of sentences needs to be identified. The sentences are then disbursed to subsequent modules one by one.

The word embedding module 206 takes entire corpora from the sentence disburser module 204 and computes word embeddings for every word in a knowledge resource. Word embeddings are representations of a word in a low-dimensional vector space (for example, 300 dimensions). Word embeddings map a word in raw text to a vector in a pre-decided vector space. The dimensions are latent and are obtained using the knowledge base. These vectors are used to capture some notion of the syntactic and semantic features of a word in a context. Word embedding may be computed using several algorithms, for example, 'word2vec' and 'GloVe'. This is further explained in detail in conjunction with FIG. 3.

The POS tagger module 208 takes a natural language sentence as input and tags each item (word and punctuation) in the sentence with part-of-speech. This is further explained in detail in conjunction with FIG. 3. The dependency parser module 210 take a natural language sentence as an input and generates a parse tree for the given sentence. The parse tree is generated based on the intrinsic dependencies of the words in the sentence with each other. By way of an example, the dependency parser module 210 identifies the subject, main verb, and predicate/object in a natural language sentence as well as many other dependencies. This is further explained in detail in conjunction with FIG. 3.

The classifier module 212 includes a bidirectional GRU neural network, which is an artificial neural network model. It takes POS tags, the dependency parse tree and word embeddings of words as features. A raw corpus of natural language sentences is taken and each sentence is tagged with COI attribute tags. The one or more COI attribute tags may include, but are not limited to Begin Attribute tag, Inside attribute tag, and Others tag. This generates a labelled/tagged corpus. Each tagged sentence along with the features mentioned above, is fed to the classifier module 212 in order to train it to differentiate attribute words from others. The post processing module 214 accepts a sentence tagged with COI attribute tags assigned by the classifier module 212 and extracts the attributes associated with the COI of the sentence. This is further explained in detail in conjunction with FIG. 3.

Figure 3:
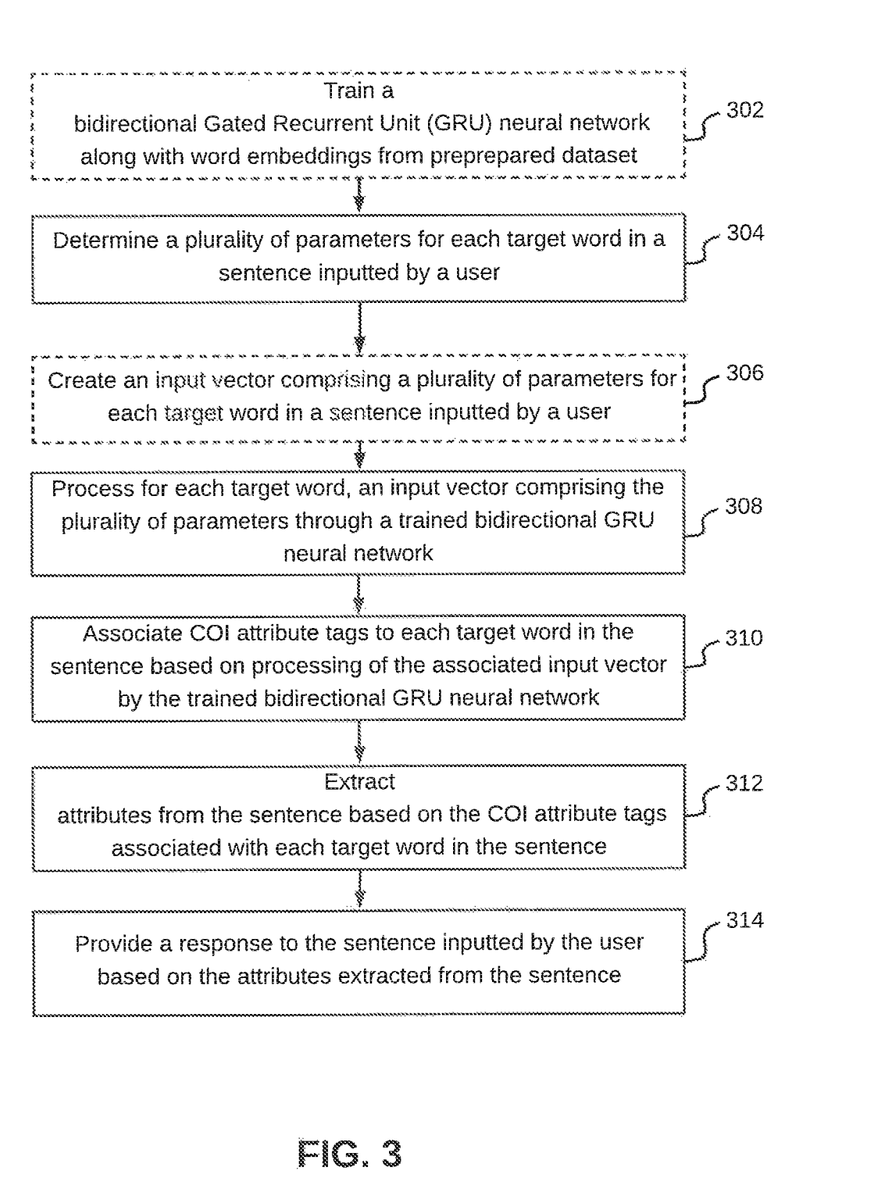
FIG. 3 illustrates a flowchart of a method for extracting attributes associated with COI from natural language sentences, in accordance with an embodiment.

Referring now to FIG. 3, a flowchart of a method for extracting attributes associated with COI from natural language sentences, in accordance with an embodiment. At step 302, the COI attribute processing device may train a bidirectional GRU neural network, along with word embeddings from pre-prepared dataset, to identify attributes associated with COI in sentences inputted by a user. The pre-prepared dataset is explained below as the knowledge base from which data is extracted and fed into the word embedding module 206. This is also further explained in detail in conjunction with FIG. 4. The sentences inputted by the user are natural language sentences. The bidirectional GRU neural network is a particular type of Recurrent Neural Network (RNN) and is selected because textual data is sequential, and RNNs are better suited for sequential type of data. Moreover, a GRU neural network has two gates, a reset gate 'r,' and an update gate 'z.' Intuitively, the reset gate determines how to combine the new input with the previous memory, and the update gate defines how much of the previous memory to keep around. If we set the reset gate to all 1's and the update gate to all 0's, a plain RNN model is arrived at.

The data used to train the bidirectional GRU neural network may primarily be extracted from generic corpora, for example, news and blogs, and may include a set of documents or articles. By way of an example, BBC news dataset with over a million words may be use for data extraction. The data may be extracted and collected in the form of a raw text corpus that includes hundreds and thousands of natural language sentences. The data may be used to extract key ingredients and is also labelled with one or more COI attribute tags in order to train the bidirectional GRU neural network. The one or more COI attribute tags may include, but are not limited to Begin Attribute tag, Inside attribute tag, and Others. These are explained in detail below. Additionally, in order to train the bidirectional GRU neural network, such that, commendable accuracies are achieved in identifying attributes, the data is collated in such a way that it is as varied as possible. This increases the span and variance of the data, thereby reducing chances of the bidirectional GRU neural network coming across completely unseen pattern instances.

To train the bidirectional GRU neural network, the extracted data, which acts as knowledge base, is manually tagged with one or more COI attribute tags. These tags are required by the bidirectional GRU neural network to understand role of a word in a context. In an embodiment, the COI attribute tags that may be used to tag words in the knowledge base may be represented as follows:

'BA'—This tag means "Begin-Attribute" and indicates that a word marks beginning of attributes associated with the COI in a sentence.

'IA'—This tag means "Inside-Attribute" and indicates that a word is part of the attributes in the sentence.

'O'—This is the "Others" tag and indicates that a word neither marks beginning of the attributes in the sentence nor is a part of the attributes.

By way of an example, for the sentence: "How can I travel from Electronic City to Bangalore Airport by bus, in the evening?" COI attribute tags may be assigned manually as represented by (1):

How_O can_O I_O travel_O to_O from_O Electronic_O City_O to_O

Bangalore_O Airport_O by_BA bus_IA,in_BA the_IA evening_IA? (1)

Thus, the following words: How, can, I, travel, to, from, Electronic, City, to, Bangalore, and Airport, are assigned the Others tag, the word "by" and "in" are assigned the Begin-Attribute tag, thereby marking the beginning of two separate attributes in the sentence, and the words: bus, the, and evening are assigned the Inside-Attribute tag. Thus, the sentence include two different attributes associated with the COI in the sentence given above, i.e., "by bus" and "in the evening." Once the extracted data is assimilated and prepared, the bidirectional GRU neural network is trained based on COI attribute tags assigned to words in sentences.

Further, in order to extract word embeddings for words in the extracted data, which is a raw text corpus, the extracted data is fed into the word embedding module 206 in the COI attribute processing device 102. The word embedding module 206 maybe a shallow artificial neural net that captures semantic and syntactic essence of words in a context. As a result, word embeddings for each word in the extracted data is obtained and latent semantic relationships among words is also extracted. As the extracted data used for training is generic, varied, and large in size, the COI attribute processing device 102 works across most occurrences of attributes associated with COI in different sentences.

A word embedding for a words is a vector representation of the word. This vector represents the syntactic and semantic essence of that word, occurring in a context. Using this vector representation, words that are unseen to the bidirectional GRU neural network may also be efficiently handled. In order to obtain word embedding, the input is a word from the knowledge base and output is the context of the word. The context of the word may have a window size of 10, for example, which may be an average sentence size in the knowledge base. Thus, a word is represented by the context of the words in its vicinity. By way of an example, the words 'urgently' and 'immediately' may appear in similar contexts in the knowledge base, thus their vector representation may be similar and the bidirectional GRU neural network may predict them correctly. As continuation of the example above, the word 'urgently' may have been used to train the bidirectional GRU neural network to tag the word 'urgently' as an attribute associated with the COI of a sentence. As the bidirectional GRU neural network is trained using word embeddings, when it encounters the word 'immediately' (which may be a new word), the bidirectional GRU neural network will classify the word 'immediately' also as an attribute associated with the COI of a sentence. This is because vector representation of the words 'urgently' and 'immediately' may be similar.

Once the bidirectional GRU neural network has been trained, a sentence may be inputted by a user in the form of a textual input or a vocal input. The sentence may be provided to an intelligent system (or man machine interface system) installed on the COI attribute processing device 102. Examples of the intelligent system may include, but are not limited to an intelligent personal assistant, search engine, chat bots, question answering systems, conversation engines, or data mining tools.

At step 304, the COI attribute processing device 102 determines a plurality of parameters for each target word in the sentence inputted by the user. For a target word, the plurality of parameters include a POS vector associated with the target word. The POS vector includes a POS tag for the target word and a POS tag for two or more words preceding the target word in the sentence. For each target word, a POS vector is considered because in a sentence, the label of a target word depends on the context of the previous words in the sentence. For an input sentence in natural language, each word is tagged with an appropriate POS tag. Examples of POS tags may include, but are not limited to NNP, i.e., proper noun, VB, i.e., verb, PRP, i.e., preposition, NN, i.e., noun, RB, i.e., adverb, and IN, i.e., interjection. By way of an example, for the sentence: "I could not go to my office as it was raining," will be POS tagged as represented by (2):

I/PRP could/VB not/RB go/VB to/TO my/PRP office/NN as/IN it/PRP was/VB raining/VB (2)

For a target word in a sentence, the POS vector may be represented using equation 3 given below:

POS Vector=$(x_{i-2}, x_{i-1}, x_i)$ (3)

where, $x_i$ is the POS tag assigned to the target word;

$x_{i-1}$ is the POS tag assigned to the first word immediately preceding
the target word in the sentence;

$x_{i-2}$ is the POS tag assigned to the second word immediately preceding the target word in the sentence.

Thus, a POS vector for each word in the sentence inputted by the user will be determined. In continuation of the example given above, for the word "raining," the two preceding words are "it" and "was." Thus, the POS vector for the word "raining" is represented by 4:

POS vector for "raining"=$(PRP, VB, VB)$ (4)

The plurality of parameters for the target word further include a word embedding of the target word and a word embedding for a head word of the target word in a dependency parse tree for the sentence. This may be represented by 5 and 6 below:

Word embedding for the target word–$W_i$ (5)

Word embedding for the head word–$W_h$ (6)

A head word for the target word may be determined based on a dependency parse tree made for the sentence. The dependency parser tree depicts dependencies between words within the sentence. In a dependency parser tree, the grammatical structure of the sentence is also analyzed thereby establishing relationships between head words and words which modify these head words. The dependency parser tree may include two parts, i.e., a parser tree and dependencies among the words in the sentence. These dependencies include different dependency labels. By way of an example, a parser tree for the following sentence: "I could not go to my office as it was raining" is depicted below:

```
(ROOT
    (S
        (NP (PRP I))
        (VP (MD could) (RB not)
            (VP (VB go)
                (PP (TO to)
                    (NP (PRP$ my) (NN office)))
                (SBAR (IN as)
                    (S
                        (NP (PRP it))
                        (VP (VBD was)
                            (VP (VBG raining)))))))))
```

The dependencies for the above parser tree, which may be determined based on Stanford type dependencies, are depicted below. The dependencies include multiple dependency labels. The Stanford type dependencies are explained in detail in the paper titled "Stanford Typed Dependencies Manual," authored by Marie-Catherine de Marneffe and Christopher D. Manning, and published in September 2008.

nsubj(go—4, I—1)
aux(go—4, could—2)
neg(go—4, not—3)
root (ROOT—0, go—4)
case(office—7, to—5)
nmod:poss(office—7, my—6)
nmod(go—4, office—7)
mark(raining—11, as—8)
nsubj(raining—11, it—9)
aux(raining—11, was—10)
advcl(go—4, raining—11)

The dependencies are based on head word for each target word. For example, the dependency label: nsubj (go—4, I—1) implies that "I" is the subject of the sentence and the head word is the verb "go."

By way of another example, for the sentence: "I want to travel to Pune by bus, in the evening." The dependencies and labels may be depicted as follows:

| 1 | I | _ | PRP | PRP | _ | 2 | nsubj | _ |
|---|---|---|---|---|---|---|---|---|
| 2 | want | _ | VB | VBP | _ | 0 | null | _ |
| 3 | to | _ | TO | TO | _ | 4 | aux | _ |
| 4 | travel | _ | VB | VB | _ | 2 | xcomp | _ |
| 5 | to | _ | TO | TO | _ | 6 | aux | _ |
| 6 | Pune | _ | VB | VB | _ | 4 | xcomp | _ |
| 7 | by | _ | IN | IN | _ | 6 | prep | _ |
| 8 | bus | _ | NN | NN | _ | 7 | pobj | _ |
| 9 | , | _ | , | , | _ | 6 | punct | _ |
| 10 | in | _ | IN | IN | _ | 6 | prep | _ |
| 11 | the | _ | DT | DT | _ | 12 | det | _ |
| 12 | evening | _ | NN | NN | _ | 10 | pobj | _ |

For the above sentence, each word in the sentence is first tagged with a POS, and then parsed, based on the dependency structure of the sentence. The dependencies are based on head word for each word. For example, the words 'bus' and 'evening' are the objects (pobj) and the head word for 'bus' is the word 'by' (indicated by the 7th column, with the index of the head word 'by'). Similarly, the head word for 'evening' is 'in'.

The plurality of parameters for the target word further include a dependency label for the target word. The dependency label for the target word indicates relation of the target with the head word in the sentence. The dependency label for the target word may be depicted by 7 given below:

$$\text{Dependency label for the target word} - D_i \qquad (7)$$

Once the plurality of parameters discussed above have been determined for each target word, the COI attribute processing device 102, at step 306 creates an input vector that includes the plurality of parameters for each target word in the sentence inputted by the user. The input vector includes the plurality of parameters determined at 3, 5, 6, and 7 given above. The input vector at time 't' may be depicted by equation 8 given below:

$$x_t = (x_{i-2}, x_{i-1}, x_i, W_i, W_h, D_i) \qquad (8)$$

where,
$x_t$ is the input vector.

Thereafter, the COI attribute processing device 102, at step 308, processes the input vector for each target word through the trained bidirectional GRU neural network. As discussed in step 302, the trained bidirectional GRU neural network is trained to identify attributes associated with COI from a plurality of sentences. The input vector may thus be fed into the trained bidirectional GRU neural network. This input vector is fed into the trained bidirectional GRU neural network which is a particular type of RNN. The architecture of the trained bidirectional GRU neural network is a Bidirectional one. This enables the trained bidirectional GRU neural network to scan the input both backwards and forwards. This goes in sync with Dependency Parser based features used in the input vector. In a deep neural net, simply providing word embeddings of the input text would have sufficed. However, the embodiment provides extra features to the trained bidirectional GRU neural network, as the relationships between individual word tokens as well as parts-of-speech are relevant features, and enable the trained bidirectional GRU neural network to perform more efficiently. As identifying attributes associated with the COI of a sentence is a complex task, the input vector of this embodiment is required to include more vivid details, when compared with conventional techniques that use simpler input vectors for simpler deep learning architectures.

In an exemplary embodiment, feed-forward equations of the trained bidirectional GRU neural network may be formally represented using equations 9, 10, 11, and 12 given below:

$$z = \sigma(x_t U^z + s_{t-1} W^z) \qquad (9)$$

$$r = \sigma(x_t U^r + s_{t-1} W^r) \qquad (10)$$

$$h = \tanh(x_t U^h + (s_{t-1} * r) W^h) \qquad (11)$$

$$s_t = (1-z) * h + z * s_{t-1} \qquad (12)$$

where,
z is the update gate and r is the reset gate. All the gates have the same dimensions $d_s$, the size of the hidden state;
U and W are weight matrices;
h is a "candidate" hidden state that is computed based on the current input and the previous hidden state;
$s_t$ is the current hidden state and $s_{t-1}$ is the previous hidden state; and
'*' is elementwise multiplication.

In an embodiment, for the above equations, categorical cross-entropy may be used as the loss function. Further, Stochastic Gradient Descent may be used for optimizing the loss function with Adaptive Momentum to optimize the gradient descent algorithm.

Based on processing of associated input vector using the bidirectional GRU neural network, the COI attribute processing device 102, at step 310, associates COI attribute tags to each target word in the sentence based on processing of associated input vector through the trained bidirectional GRU neural network. Thus, each word in the sentence is tagged with one or more of the following COI attribute tags: BA, IA or O. These COI attribute tags have been explained before. By way of an example, for the sentence: "I am travelling to Pune by bus in the evening," after input vectors for each word in this sentence are processed by the trained bidirectional GRU neural network, the following COI attribute tags are assigned to each word in the sentence:

"I_O am_O travelling_O to_O Pune_O by_BA bus_IA in_BA the_IA evening_IA"

The following words are assigned the Others tag to the following words: I, am, travelling, to, and Pune. The following words are assigned the Begin Attributes tags: by and in. Finally, the following words are assigned the Inside Attribute tag: bus, the, and evening. Based on the COI attribute tags assigned to each target word in the sentence, the COI attribute processing device 102, at step 312, extracts the attributes from the sentence. In continuation of the example above, the attributes are extracted as: {"by bus, in the evening"}.

The attributes so extracted may then be fed into a man machine interface based cognitive and intelligent system installed on the COI attribute processing device 102, for example, a search engine, a chat bot, a dialogue based system, or a question answering system. At step 314, the COI attribute processing device 102 may provide a response to the sentence inputted by the user based on the attributes fed into the intelligent system. Since, based on the attributes, the intelligent system is able to accurately determine context of the COI in the sentence provided by the user, the intelligent system is able to provide a very relevant response. The response may include one or more of an answer to the query and an action corresponding to the query.

By way of an example, a user query may be received through a conversation engine installed on the COI attribute processing device 102. The user query may be: "I want to travel to Bangalore Airport by bus, tomorrow." From the inputted query, "travel to Bangalore Airport" may be identified as a part of the user intent. However, merely based on the user intent, the conversation engine may not be able to provide an accurate response or perform a relevant action. However, as based on the method described above, when attributes, i.e., "by bus, tomorrow," are also extracted from the inputted sentence, the conversation engine may be able to provide an accurate response. For example, the conversation engine may provide tomorrow's time schedule for buses departing for the Bangalore Airport from various locations in Bangalore.

Figure 4:
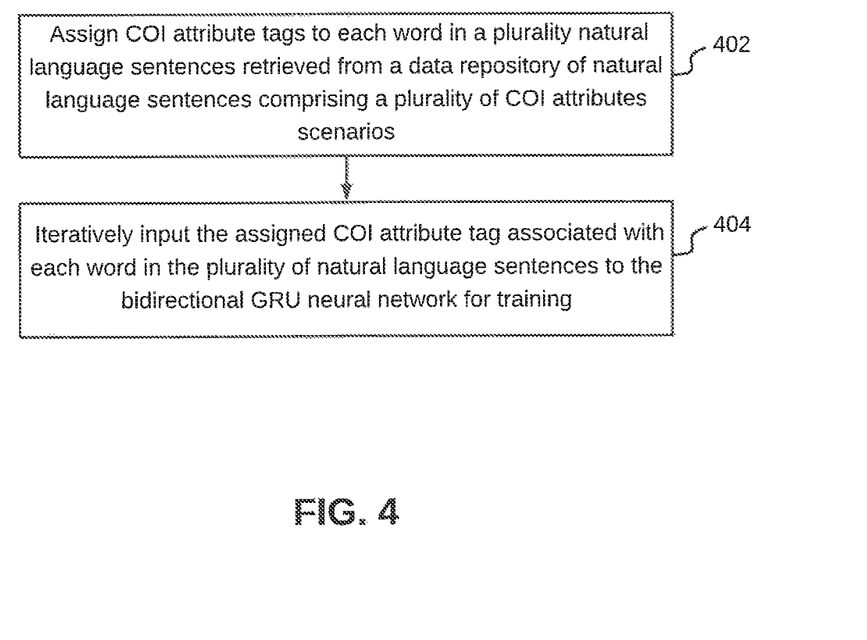
FIG. 4 illustrates a flowchart of a method for training a bidirectional Gated Recurrent Unit (GRU) neural network, in accordance with an embodiment.

Referring now to FIG. 4, a flowchart of a method for training a bidirectional GRU neural network is illustrated, in accordance with an embodiment. At step 402, COI attribute tags are manually assigned to each word in a plurality natural language sentences retrieved from a data repository. The data repository includes natural language sentences that include a plurality of COI attributes scenarios. As explained earlier, the data used to train the bidirectional GRU neural network may primarily be extracted from generic corpora, for example, news and blogs, and may include a set of documents or articles, to create a data repository. The data may be extracted and collected in the form of a raw text corpus that includes hundreds and thousands of natural language sentences. In an embodiment, only those natural language sentences that include a COI attribute scenario, may be retained in the data repository. A COI attribute scenarios, for example, may be a natural language sentence that includes attributes associated with the COI of a sentence. By way of an example, the following sentence does not include any attribute associated with the COI of the sentence: "I am going to Bangalore tomorrow." This sentence may therefore be discarded from the data repository. By way of another example, the following sentence does not include attributes associated with the COI of the sentence: "I am going to Bangalore tomorrow by train in the morning." This sentence may therefore be retained in the data repository.

Thereafter, at step 404, the assigned COI attribute tag associated with each word in the plurality of natural language sentences are iteratively inputted to the bidirectional GRU neural network in order to train the bidirectional GRU neural network. This has been explained in detail in conjunction with the step 302 in FIG. 3.

Figure 5:
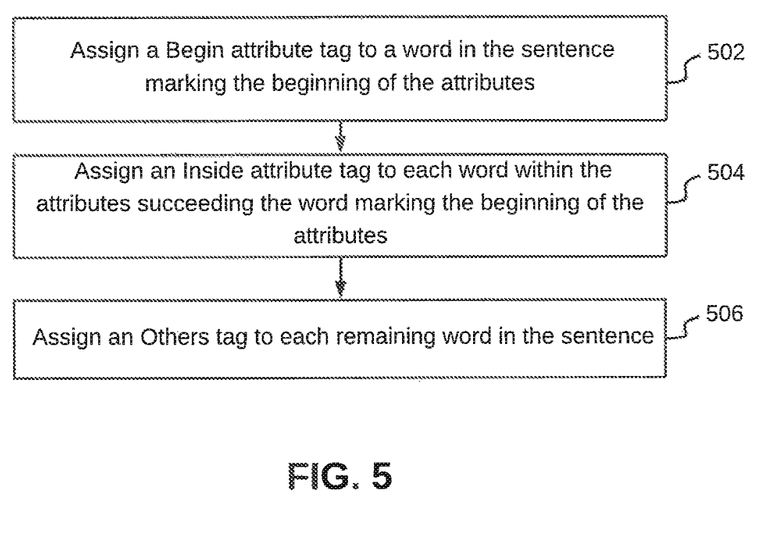
FIG. 5 illustrates flowchart of a method for associating COI attribute tags with each target word in the sentence based on processing of associated input vector, in accordance with an embodiment.

Referring now to FIG. 5, flowchart of a method for associating COI attribute tags with each target word in the sentence based on processing of associated input vector is illustrated, in accordance with an embodiment. At step 502, a Begin Attribute tag is assigned to a word in the sentence marking the beginning of the attributes. At step 504, an Inside attribute tag is assigned to each word within the attributes succeeding the word marking the beginning of the attributes. Thereafter, at step 506, an Others tag is assigned to each remaining word in the sentence. This has already been explained in detail in conjunction with FIG. 3 along with an example.

Figure 6:
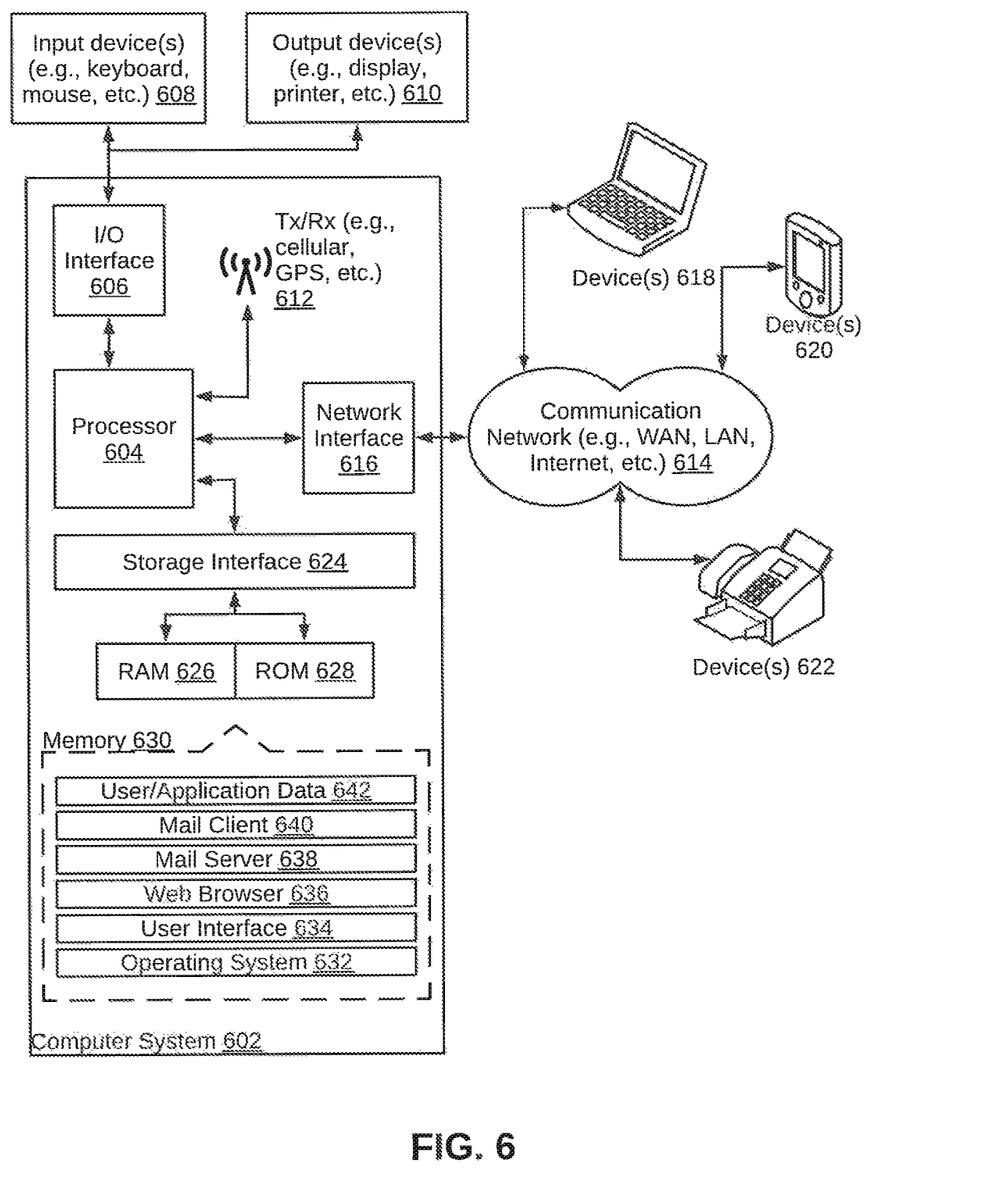
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user-generated or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WIL-INK WL1283® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for extracting attributes associated with centre of interest from natural language sentences. When user provide a user input, the user input is first broken down into individual sentences. Each sentence in turn is fed to a POS Tagger, a Dependency Parser and a Word Embedding Extractor. The outputs from these modules form the feature set of a neural network classifier that is trained earlier. These features are passed into the neural network model, which classifies each word as being an attribute associated with COI of a sentence or otherwise, and returns the text, tagged with COI attribute tags. This output is then processed and the final result, demarcating the attributes associated with the COI in individual sentences is returned.

The provided method thus identifies attributes associated with the COI of natural language sentences as part of the user intent in user utterances encountered in interactive systems. This is highly usable by interaction based intelligent systems. Moreover, the method may automatically learn words and their semantic interpretations across a huge set of words.

The claimed steps as discussed above are not routine, conventional, or well understood in the art, as the claimed steps enable the following solutions to the existing problems in conventional technologies. Conventional technologies use semantic role labels that are rule based extraction of semantic agents (nouns and verbs) of various types. This is extracted using syntactic features like grammar and POS tags. The noun and a verb of importance in a text are extracted to arrive at semantic role labels. Moreover, semantic role labels are labels given to words/phrases in a text, and are highly inefficient manner of extracting agents performing a role in a context. Semantic role labels thus do not find application in advanced machine learning and deep learning systems.

However, in the claimed steps, semantic features in a deep neural network, i.e., a bidirectional GRU neural network, are used to extract context based attributes. The bidirectional GRU neural network is selected because textual data is sequential, and it is better suited for sequential type of data. Moreover, a GRU neural network has two gates, a reset gate 'r,' and an update gate 'z.' Intuitively, the reset gate determines how to combine the new input with the previous memory, and the update gate defines how much of the previous memory to keep around. Thus, the way COI attribute tags are assigned in the claim steps is also different from the conventional technology. Moreover, in the claimed steps, features like word embeddings, dependency parser labels, word embedding of head word in dependency parse tree are used for extracting one or more words of interest. The claimed steps thus have deeper semantic features and capture a more vivid understanding of context.

Another conventional technology uses d-dimensional vectors, which are not word embeddings, and is a sparse feature, because of which the conventional technology replaces words by parts-of-speech in order to make it denser. However, in the claimed steps, word embeddings are used which are dense representations of textual semantics. Yet another conventional technology discloses usage of a combination of Word embeddings, POS tagging, and dependence extraction/labelling, which are given as input to a neural network. However, in the claimed steps usage of dependency parser, is intended to capture innate dependencies between words in a sentence, and is thus different from the conventional technology. The conventional technology does not employ any such deep semantic feature.

The specification has described method and device for extracting attributes associated with centre of interest from natural language sentences. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for extracting attributes associated with Center of Interest (COI) from natural language sentences, the method comprising:

creating, by a COI attribute processing device, an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word;

processing for each target word, by the COI attribute processing device, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI;

associating, by the COI attribute processing device, COI attribute tags to each target word in the sentence based on processing of associated input vector through the trained bidirectional GRU neural network;

extracting, by the COI attribute processing device, attributes from the sentence based on the COI attribute tags associated with each target word in the sentence; and providing, by the COI attribute processing device, a response to the sentence inputted by the user based on the attributes extracted from the sentence.

2. The method of claim 1, wherein the response comprises at least one of an answer to a query and an action corresponding to the query.

3. The method of claim 1, wherein the dependency label for the target word indicates relation of the target word with the head word in the sentence.

4. The method of claim 1 further comprising training the bidirectional GRU neural network to identify COI attribute tags for words within sentences.

5. The method of claim 4, wherein training the bidirectional GRU neural network comprises:
assigning COI attribute tags to each word in a plurality natural language sentences retrieved from a data repository of natural language sentences comprising a plurality of COI attributes scenarios;
inputting, iteratively, the assigned COI attribute tag associated with each word in the plurality of natural language sentences to the bidirectional GRU neural network for training.

6. The method of claim 1, wherein the COI attribute tags comprise Begin attribute tag, Inside attribute tag, and Others tag.

7. The method of claim 6, wherein the associating the COI attribute tags to each target word comprises:
assigning a Begin attribute tag to a word in the sentence marking the beginning of the attributes;
assigning an Inside attribute tag to each word within the attributes succeeding the word marking the beginning of the attributes; and
assigning an Others tag to each remaining word in the sentence.

8. The method of claim 1 further comprising determining the plurality of parameters for each target word in the sentence inputted by the user.

9. A Center of Interest (COI) attribute processing device for extracting attributes associated with COI from natural language sentences, the COI attribute processing device comprising:
a processor; and
a memory communicatively coupled to the processor, wherein the memory stores processor instructions, which, on execution, causes the processor to:
create an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word;
process for each target word, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI;
associate COI attribute tags to each target word in the sentence based on processing of associated input vector through the trained bidirectional GRU neural network;
extract attributes from the sentence based on the COI attribute tags associated with each target word in the sentence; and
provide a response to the sentence inputted by the user based on the attributes extracted from the sentence.

10. The COI attribute processing device of claim 9, wherein the response comprises at least one of an answer to a query and an action corresponding to the query.

11. The COI attribute processing device of claim 9, wherein the dependency label for the target word indicates relation of the target word with the head word in the sentence.

12. The COI attribute processing device of claim 9, wherein the processor instructions further cause the processor to train the bidirectional GRU neural network to identify COI attribute tags for words within sentences.

13. The COI attribute processing device of claim 12, wherein to train the bidirectional GRU neural network, the processor instructions further cause the processor to:
assign COI attribute tags to each word in a plurality natural language sentences retrieved from a data repository of natural language sentences comprising a plurality of COI attributes scenarios;
iteratively input the assigned COI attribute tag associated with each word in the plurality of natural language sentences to the bidirectional GRU neural network for training.

14. The COI attribute processing device of claim 9, wherein the COI attribute tags comprise Begin attribute tag, Inside attribute tag, and Others tag.

15. The COI attribute processing device of claim 14, wherein to associate the COI attribute tags to each target word, the processor instructions further cause the processor to:
assign a Begin attribute tag to a word in the sentence marking the beginning of the attributes;
assign an Inside attribute tag to each word within the attributes succeeding the word marking the beginning of the attributes; and
assign an Others tag to each remaining word in the sentence.

16. The COI attribute processing device of claim 9, wherein the processor instructions further cause the processor to determine the plurality of parameters for each target word in the sentence inputted by the user.

17. A non-transitory computer-readable storage medium having stored thereon, a set of computer-executable instructions causing a computer comprising one or more processors to perform steps comprising:
creating an input vector comprising a plurality of parameters for each target word in a sentence inputted by a user, wherein the plurality of parameters for each target word comprise a Part of Speech (POS) vector associated with the target word and at least two words preceding the target word, a word embedding for the target word, a word embedding for a head word of the target word in a dependency parse tree for the sentence, and a dependency label for the target word;
processing for each target word, the input vector through a trained bidirectional Gated Recurrent Unit (GRU) neural network, wherein the trained bidirectional GRU neural network is trained to identify attributes associated with COI from a plurality of sentences, and wherein attributes associated with a COI in a sentence augment the context of the COI;

associating COI attribute tags to each target word in the sentence based on processing of associated input vector through the trained bidirectional GRU neural network;

extracting attributes from the sentence based on the COI attribute tags associated with each target word in the sentence; and providing a response to the sentence inputted by the user based on the attributes extracted from the sentence.

* * * * *